(12) United States Patent
Yeh et al.

(10) Patent No.: US 8,111,512 B2
(45) Date of Patent: Feb. 7, 2012

(54) HANDHELD ELECTRONIC DEVICE

(75) Inventors: Chih-Shan Yeh, Taoyuan County (TW);
Chao-Yi Chen, Taoyuan County (TW);
Tsung-Yuan Ou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 291 days.

(21) Appl. No.: 12/634,695

(22) Filed: Dec. 10, 2009

(65) Prior Publication Data

US 2010/0296232 A1 Nov. 25, 2010

(30) Foreign Application Priority Data

May 19, 2009 (TW) .............................. 98116564 A

(51) Int. Cl.
*G06F 1/16* (2006.01)
*G06F 3/02* (2006.01)
*G09G 5/00* (2006.01)

(52) U.S. Cl. ......... 361/679.59; 361/679.55; 361/679.56; 345/156; 345/169; 345/905

(58) Field of Classification Search ........... 361/679.01–679.45, 679.55–679.59; 312/223.1, 223.2; 345/156, 157, 168, 169, 345/905
See application file for complete search history.

(56) References Cited

U.S. PATENT DOCUMENTS

| | | | | |
|---|---|---|---|---|
| 6,053,589 A | * | 4/2000 | Lin | 312/271 |
| 6,097,595 A | * | 8/2000 | Cipolla | 361/679.21 |
| 6,798,649 B1 | * | 9/2004 | Olodort et al. | 361/679.13 |
| 8,014,147 B2 | * | 9/2011 | Chen et al. | 361/679.56 |
| 2002/0080570 A1 | * | 6/2002 | Riddiford | 361/683 |
| 2007/0252202 A1 | | 11/2007 | Park et al. | |
| 2008/0180892 A1 | * | 7/2008 | Lai | 361/680 |
| 2008/0304215 A1 | | 12/2008 | Chiu | |

FOREIGN PATENT DOCUMENTS

| | | |
|---|---|---|
| EP | 1773031 | 4/2007 |
| EP | 1777923 | 4/2007 |

OTHER PUBLICATIONS

"Search Report of European Counterpart Application", issued on Jul. 22, 2010, 2010, p1-p3.

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A handheld electronic device including a first body, a second body, a linkage mechanism, and a stand is provided. The second body is slidingly disposed on the first body. The linkage mechanism is disposed between the first body and the second body. The linkage mechanism has a driven end and a drive end, wherein the driven end is driven by the first body and the second body. The stand is slidingly disposed between the first body and the second body and is driven by the drive end of the linkage mechanism. When the second body moves away the first body along an operation direction, the drive end drives the stand to move along the operation direction and the stand is exposed by the first body. The handheld electronic device then achieves a standing function through the stand.

10 Claims, 13 Drawing Sheets

HANDHELD ELECTRONIC DEVICE

CROSS-REFERENCE TO RELATED APPLICATION

This application claims the priority benefit of Taiwan application serial No. 98116564, filed on May 19, 2009. The entirety of the above-mentioned patent application is hereby incorporated by reference herein and made a part of this specification.

BACKGROUND OF THE INVENTION

1. Field of the Invention

The present application generally relates to a handheld electronic device, and more particularly, to a application electronic device with a standing function.

2. Description of Related Art

A handheld electronic device is an electronic device which can be carried around by a user. A handheld electronic device is usually very small and light-weighted so that it can be carried around conveniently. Existing handheld electronic devices include mobile phones, multimedia players, personal digital assistants (PDAs), palmtop game consoles, handheld satellite navigators, and notebook computers, etc.

Most existing handheld electronic devices in the market do not come with any bracket or stand. Accordingly, when a user wants to place a handheld electronic device on a tabletop to watch a movie, the user has to do so by using a supporting tool, such as a dock compatible to the handheld electronic device. In order words, the user has to purchase a dock compatible to the handheld electronic device to accomplish the standing function of the handheld electronic device. However, since the dock can not be carried around conveniently, the standing function of the handheld electronic device cannot be achieved just anywhere. On the other hand, sometimes it is inconvenient for the user to hold the handheld electronic device by hand.

SUMMARY OF THE INVENTION

Accordingly, the present application is directed to a handheld electronic device with a standing function, and a user can use the handheld electronic device without having to hold the handheld electronic device by hand or through any supporting tool.

The present application provides a handheld electronic device including a first body, a second body, a linkage mechanism, and a stand. The second body is slidingly disposed on the first body. The linkage mechanism is disposed between the first body and the second body. The linkage mechanism has a driven end and a drive end, wherein the driven end is driven by the first body and the second body. The stand is slidingly disposed between the first body and the second body and is driven by the drive end of the linkage mechanism. When the second body moves away the first body along an operation direction, the drive end drives the stand to move along the operation direction, and the stand is exposed by the first body.

As described above, when a user uses a handheld electronic device in the present application, the user simply slides the second body relative to the first body along an operation direction so that the stand is exposed by the first body through the action of the linkage mechanism and then pivots away from the second body. Thus, the handheld electronic device in the present application can stand on a surface through the stand thereof. Thereby, the user can watch movie or listen to music by using the handheld electronic device without having to hold the handheld electronic device by hand or through any supporting tool.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
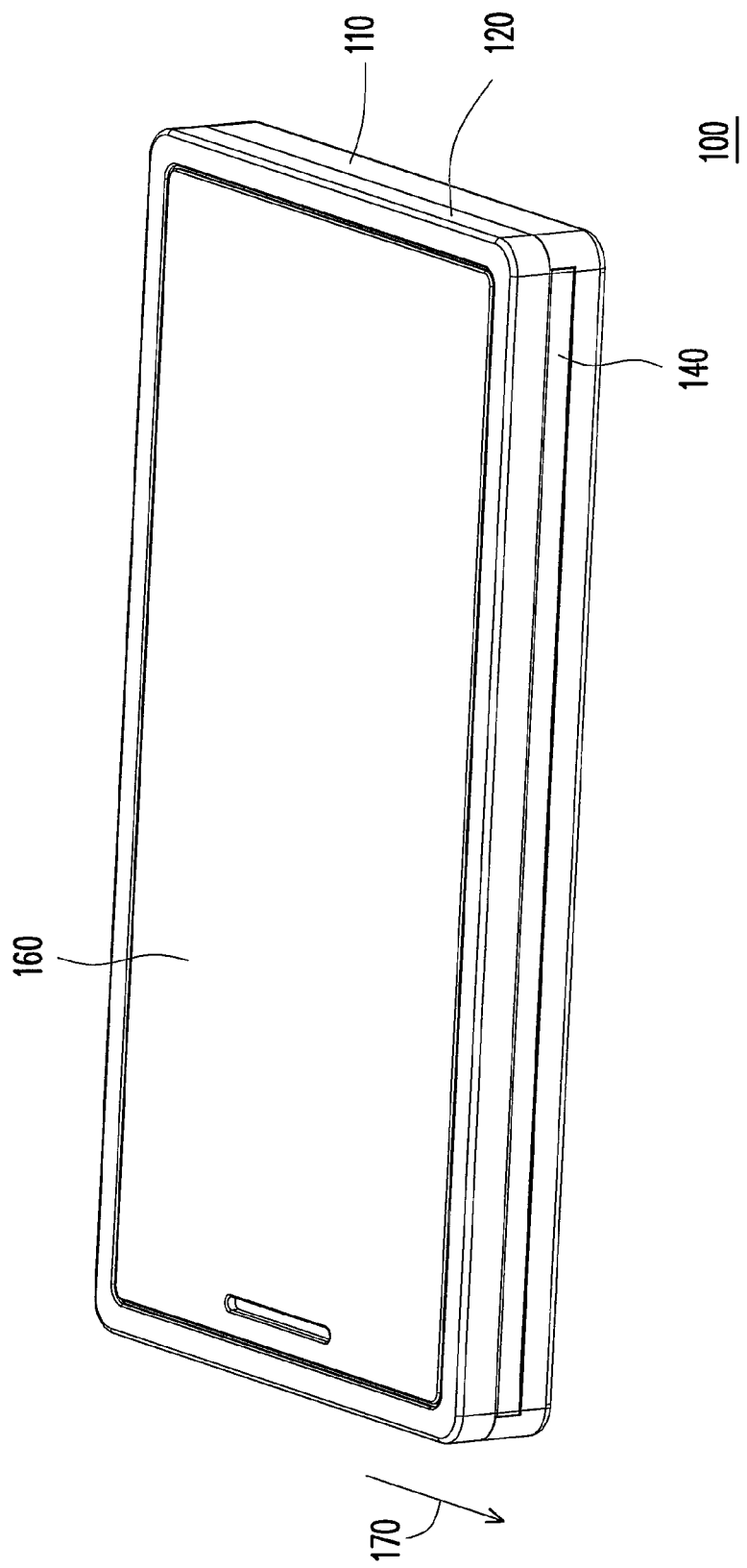
FIGS. 1A~1C illustrate how a handheld electronic device achieves a standing function according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
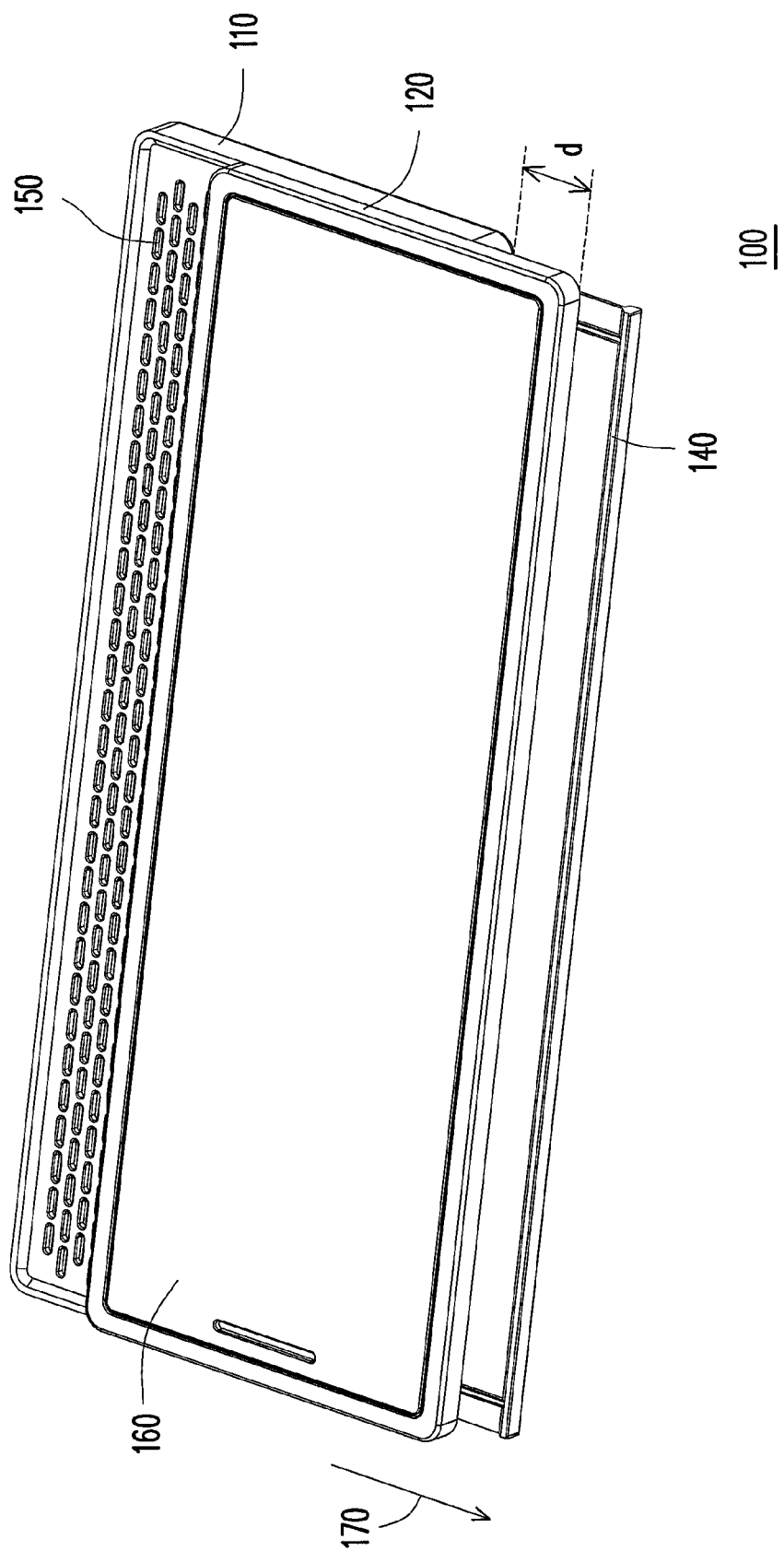
Figure 1C:
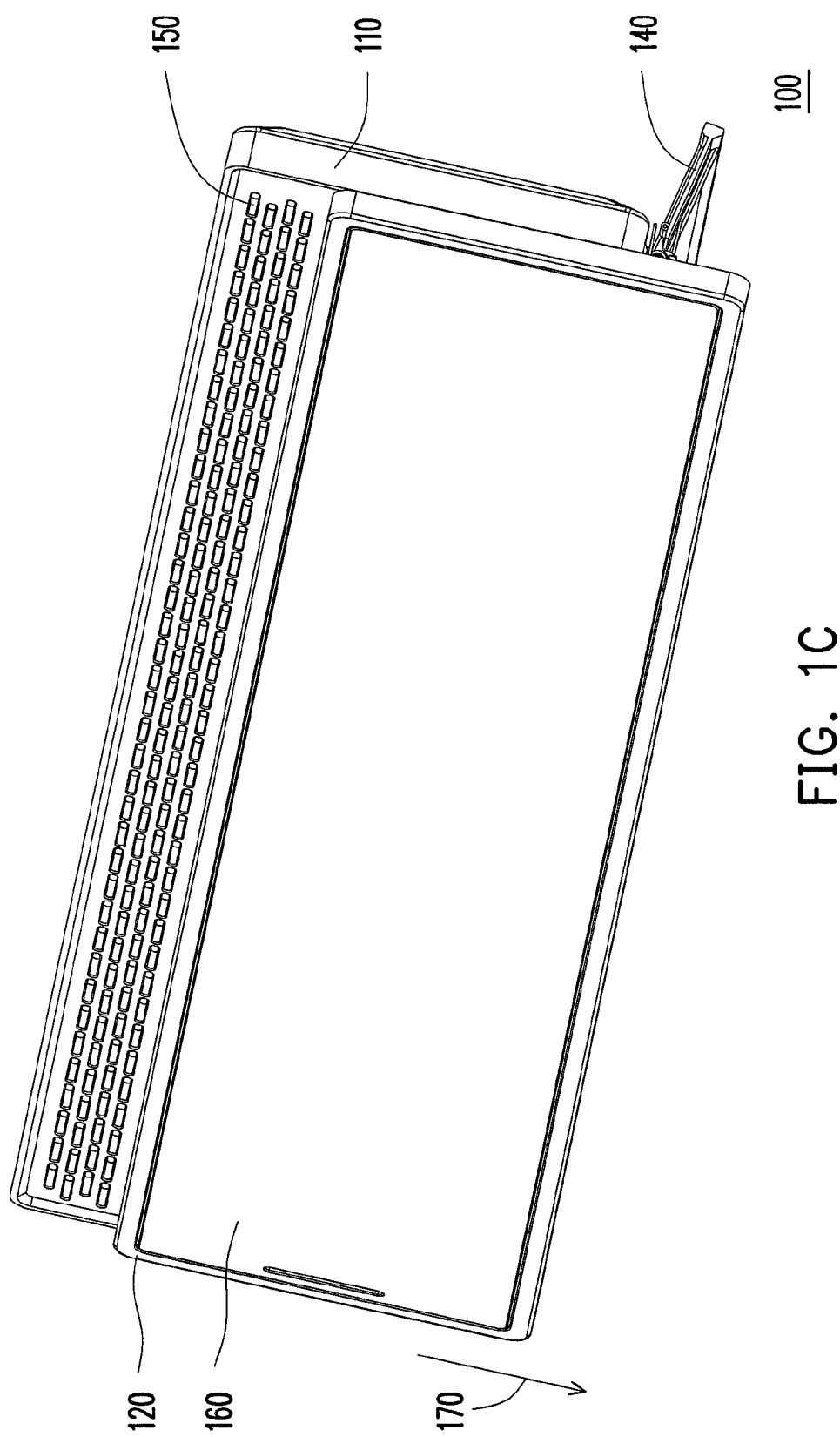
Figure 2:
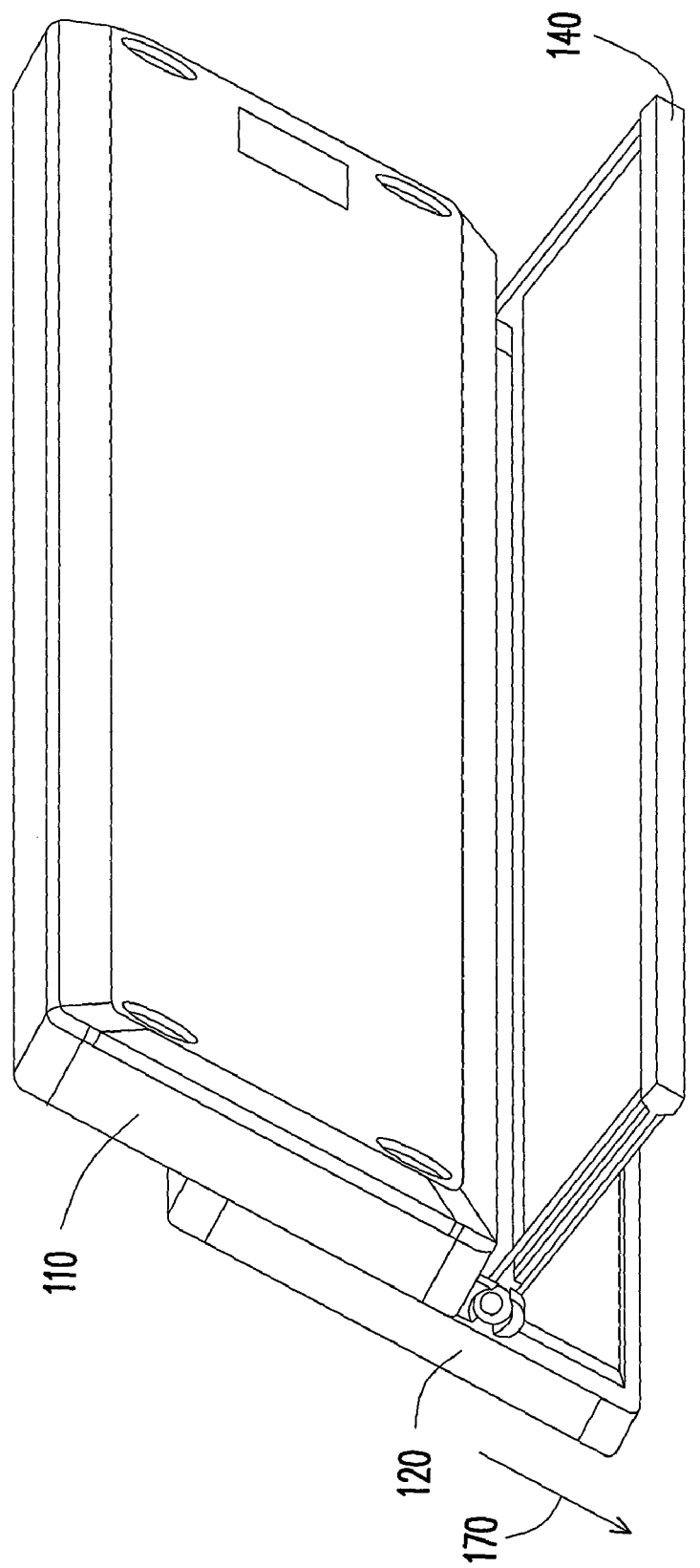
FIG. 2 is a diagram of the handheld electronic device of FIG. 1C in another view angle.
Figure 3A:
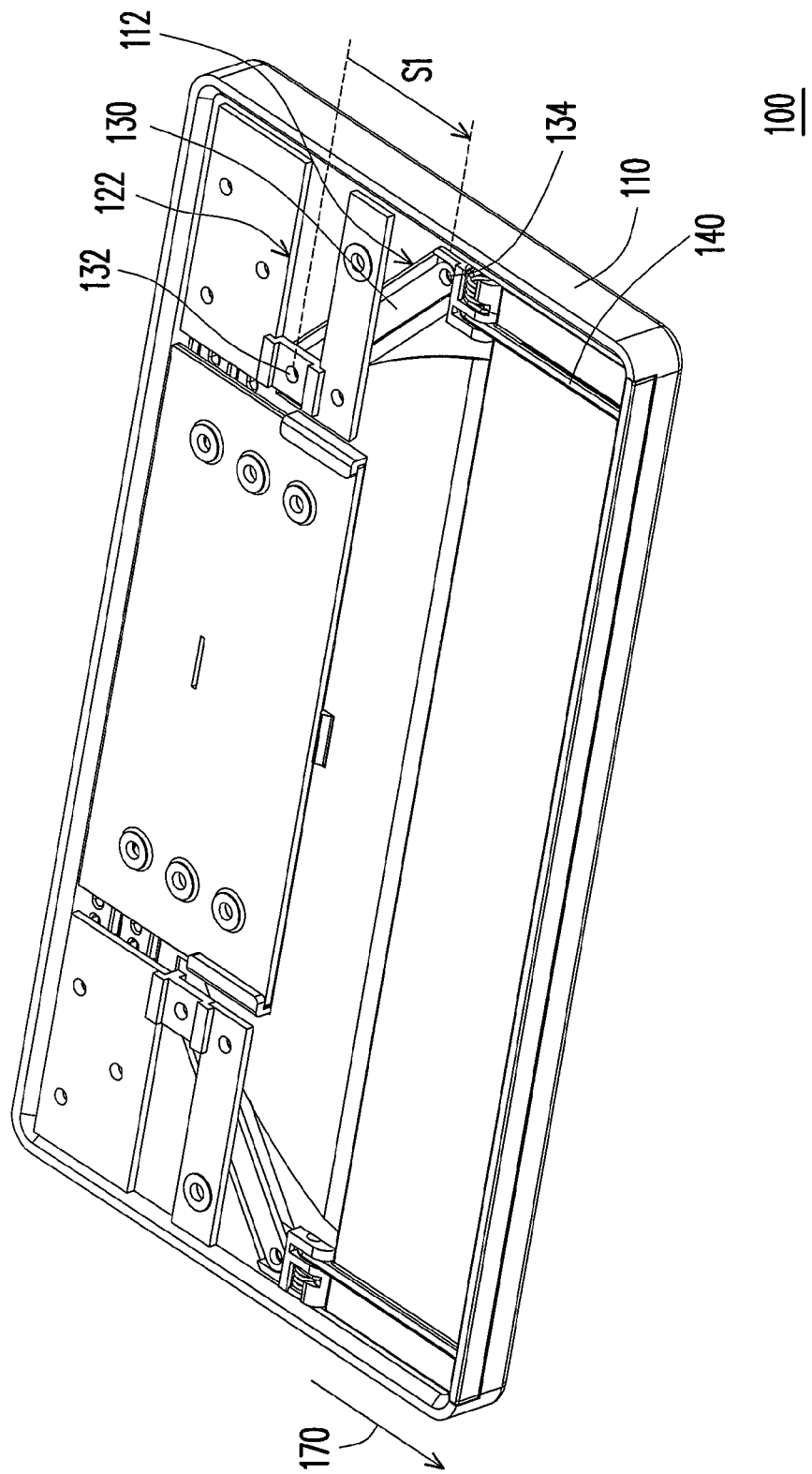
FIGS. 3A~3C illustrate the operation flow of a linkage mechanism in a handheld electronic device.

FIGS. 1A~1C illustrate how a handheld electronic device achieves a standing function according to an embodiment of the present invention. FIG. 2 is a diagram of the handheld electronic device of FIG. 1C in another view angle. Referring to FIG. 1A and FIG. 1B, the handheld electronic device 100 includes a first body 110, a second body 120, a linkage mechanism 130 (as shown in FIG. 3A), and a stand 140, wherein the second body 120 is slidingly disposed on the first body 110. In the present embodiment, the handheld electronic device 100 may be a sliding cell phone, a sliding personal digital assistant (PDA), multimedia players, palmtop game consoles, handheld satellite navigators, and tablet computers.

In the present embodiment, a screen 160 is disposed on the second body 120 of the handheld electronic device 100, wherein the screen 160 may be a liquid crystal display (LCD) screen. Besides, to accomplish a multimedia video/audio function, a speaker 150 may be further disposed on the first body 110 of the handheld electronic device 100. The speaker 150 is disposed at one side of the first body 110 facing the second body 120, and the screen 160 and the first body 110 are respectively located at two opposite sides of the second body 120. When a user moves the second body 120 relative to the first body 110 along an operation direction 170, the second body 120 exposes the speaker 150, and accordingly, the user can watch a movie played on the screen 160 and listen to a music played through the speaker 150 at the same time. Contrarily, when the user does not want to use the handheld electronic device 100 anymore, the user can do so by simply pushing the second body 120 back to its original position.

It should be noted that in order to accomplish the standing function of the handheld electronic device 100 and accordingly to allow the user to enjoy the video/audio function of the handheld electronic device 100, in the present embodiment, the handheld electronic device 100 is provided with a hidden stand 140. When the first body 110 and the second body 120 are closed (as shown in FIG. 1A), the stand 140 is collected into the handheld electronic device 100. When the user moves the second body 120 away from the first body 110 to open them (as shown in FIG. 1B), the stand 140 is extended out of the handheld electronic device 100. After that, as shown in FIG. 1C and FIG. 2, the stand 140 pivots away from the second body 120 so that the handheld electronic device 100 can stand on a surface with the stand 140 and the user can comfortably watch a movie through the screen 160. Below, the operation of a linkage mechanism in the handheld electronic device 100 will be described in detail with reference to accompanying drawings.

Figure 3B:
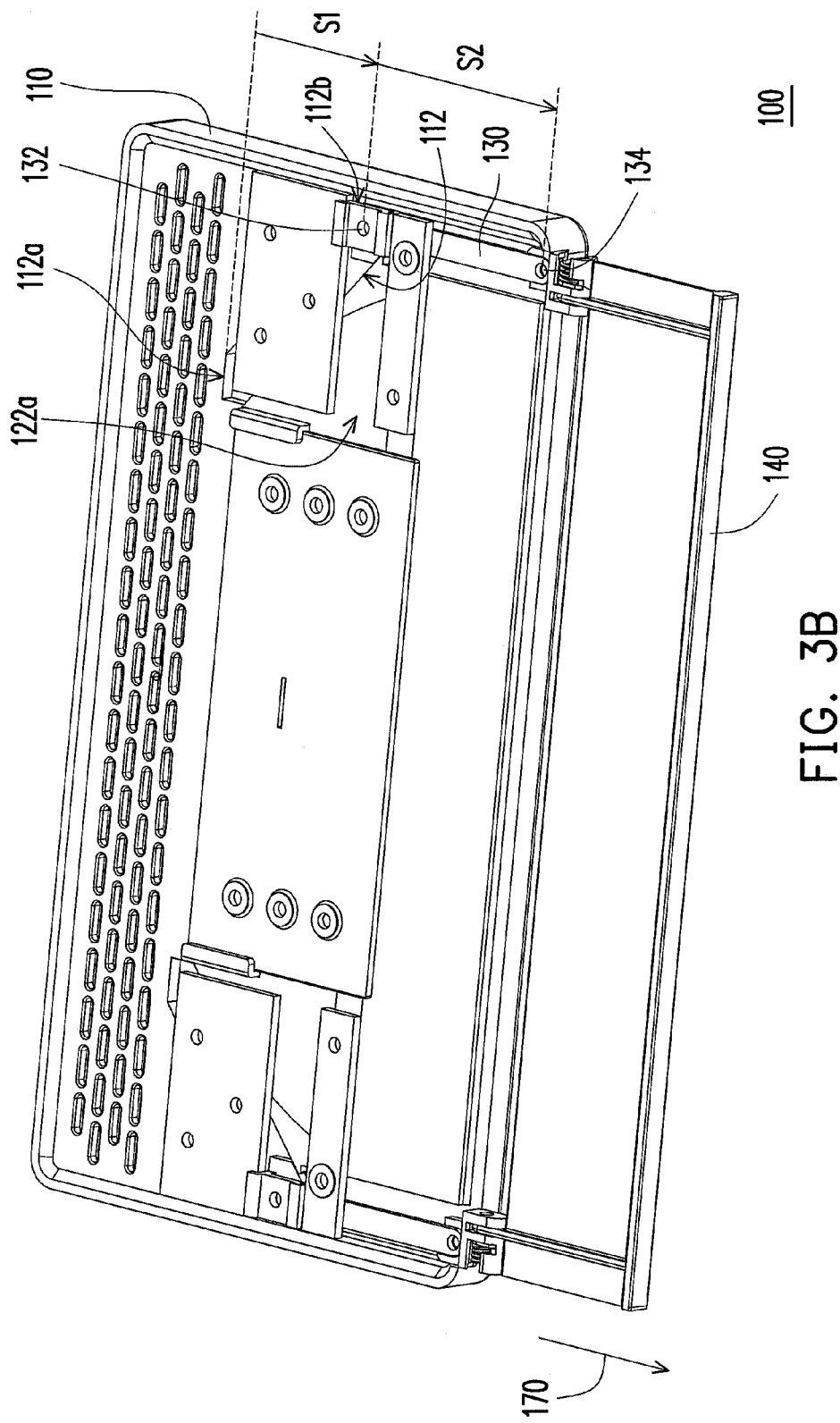
Figure 3C:
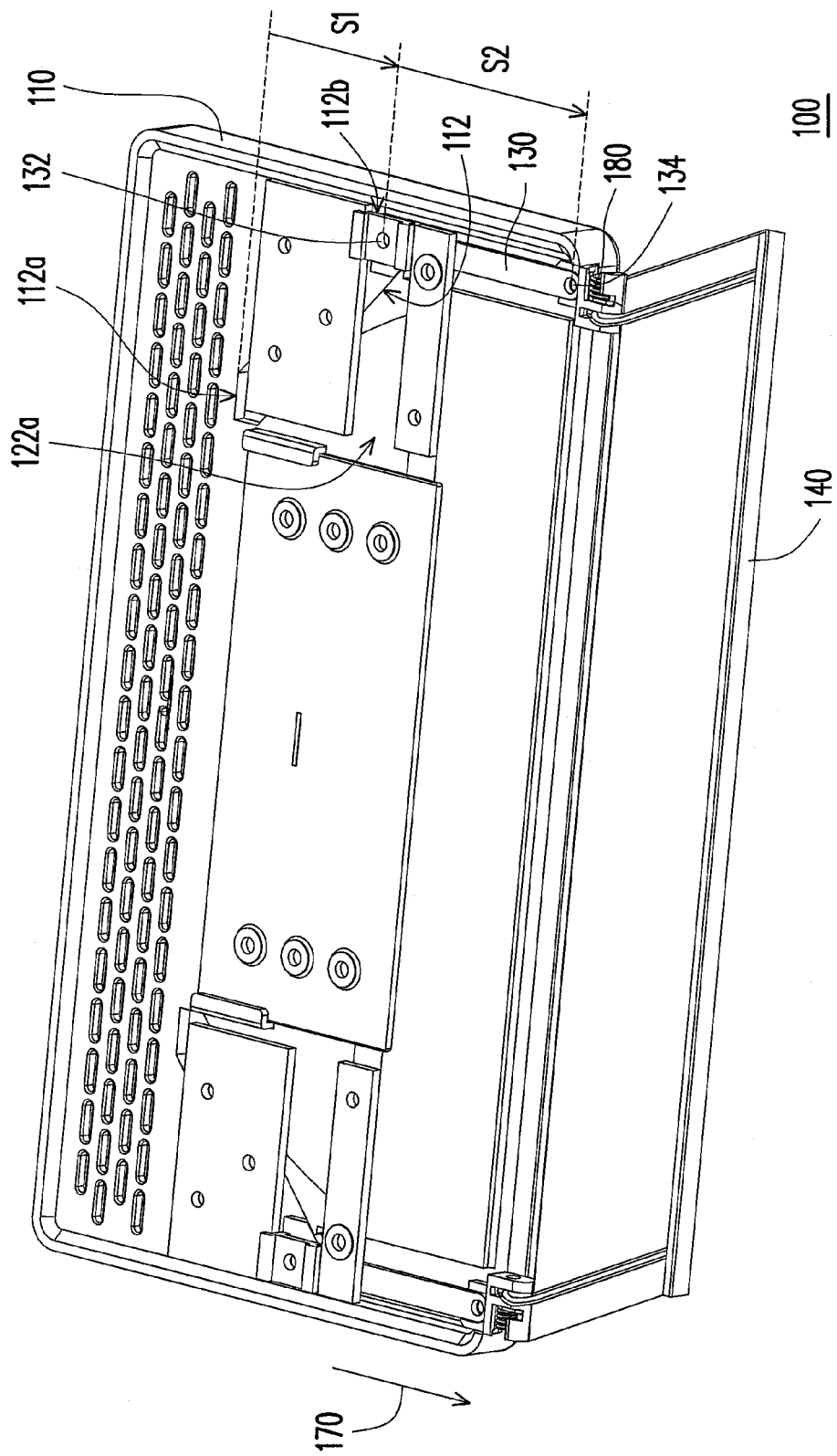

FIGS. 3A~3C illustrate the operation flow of the linkage mechanism in the handheld electronic device 100, wherein part of the second body 120 is omitted to show the linkage mechanism clearly. FIGS. 4A~4C and FIGS. 5A~5C are diagrams of the linkage mechanism in the handheld electronic device 100 in different view angles, wherein the second body 120 is skipped in FIGS. 4A~4C to show the connection between the first body 110 and the linkage mechanism clearly, and the first body 110 is skipped in FIGS. 5A~5C to show the connection between the second body 120 and the linkage mechanism clearly.

In the present embodiment, the linkage mechanism may be a connecting rod 130. A first guide rail 112 and a second guide rail 122 corresponding to the connecting rod 130 are respectively disposed on the first body 110 and the second body 120. Accordingly, the connecting rod 130 is driven by the first guide rail 112 and the second guide rail 122, and accordingly the stand 140 is driven by the connecting rod 130 and extends out of the handheld electronic device 100.

Figure 4A:
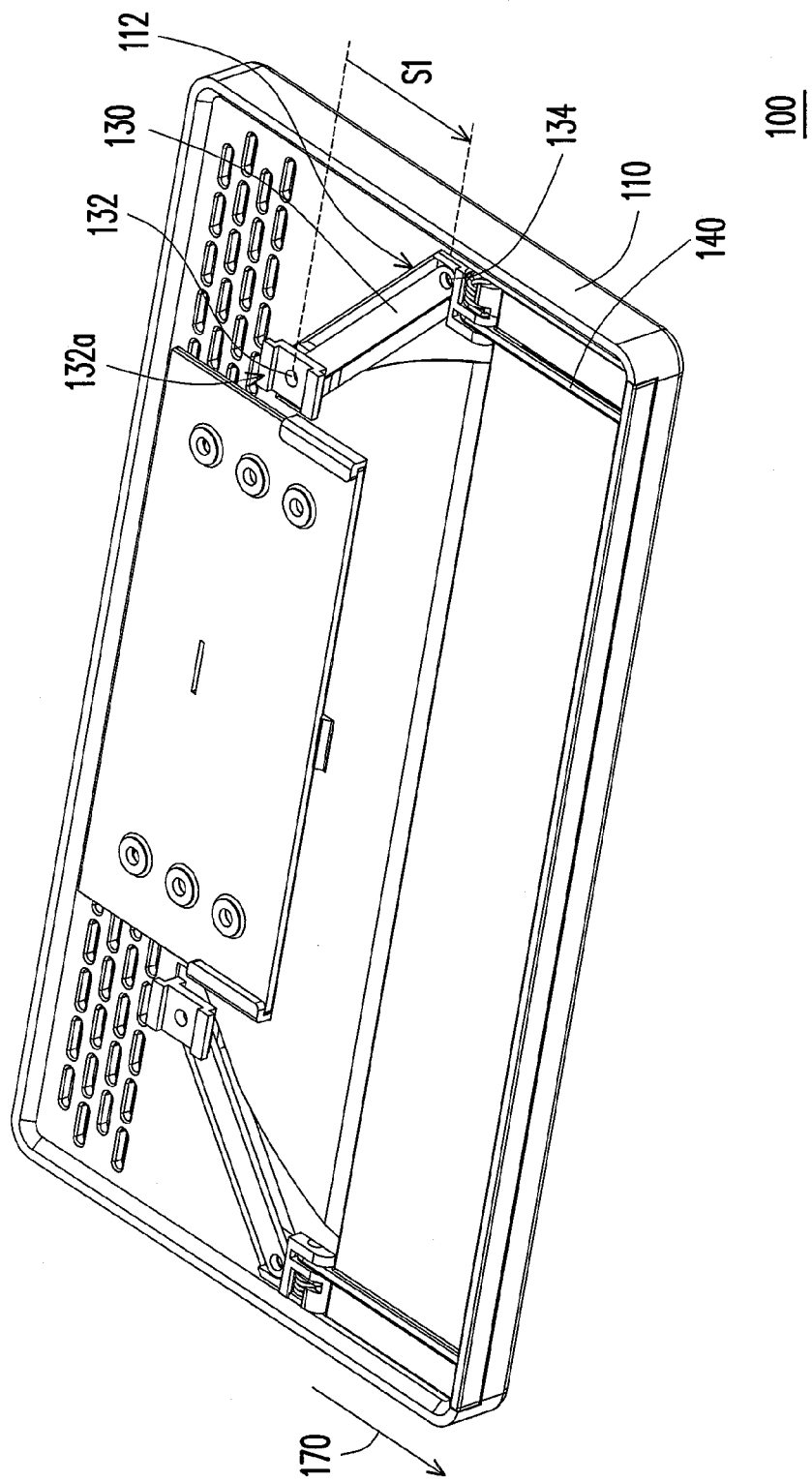
FIGS. 4A~4C and FIGS. 5A~5C are diagrams of the linkage mechanism of the handheld electronic device from different view angles.
Figure 5A:
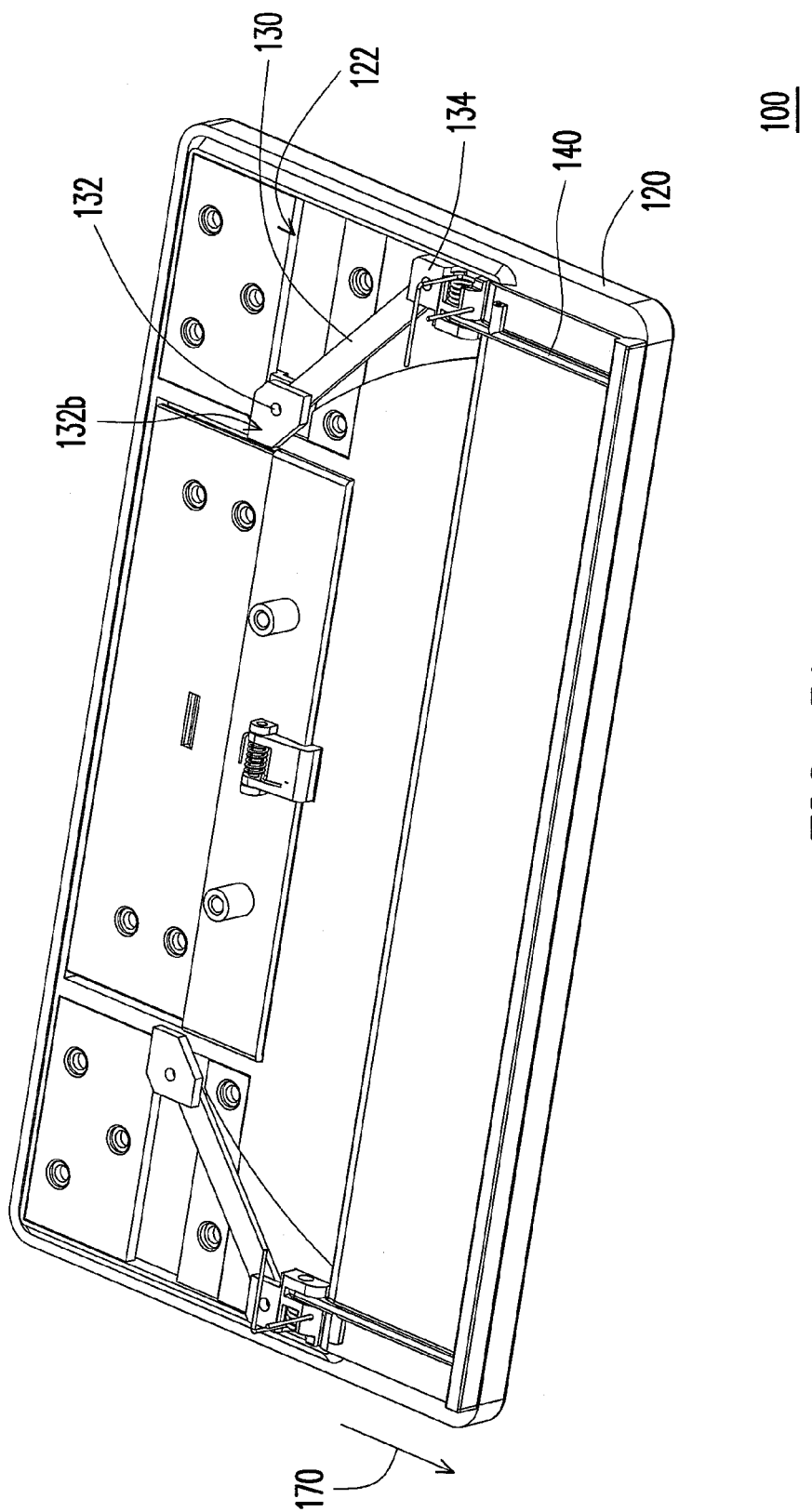

First, referring to FIG. 3A, FIG. 4A, and FIG. 5A, in the present embodiment, the connecting rod 130 disposed between the first body 110 and the second body 120 has a driven end 132 and a drive end 134, wherein the driven end 132 is driven when the second body 120 moves away from the first body 110. Besides, the stand 140 is slidingly disposed between the first body 110 and the second body 120 and is driven by the drive end 134 of the connecting rod 130.

In the present embodiment, a first guide rail 112 and a second guide rail 122 are respectively disposed on two adjacent surfaces of the first body 110 and the second body 120, and the connecting rod 130 is located between these two adjacent surfaces. One end 132 (served as a driven end) of the connecting rod 130 is slidingly disposed in the first guide rail 112 and the second guide rail 122 and located on the intersection between the first guide rail 112 and the second guide rail 122. To be specific, a first slide block 132a and a second slide block 132b are pivoted to the end 132 of the connecting rod 130, wherein the first slide block 132a is located in the second guide rail 122 and the second slide block 132b is located in the first guide rail 112 so that the end 132 of the connecting rod 130 can move along the first guide rail 112 and the second guide rail 122 when the first body 110 and the second body 120 move relatively. Besides, the other end 134 (served as a drive end) of the connecting rod 130 is connected to the stand 140.

Figure 4B:
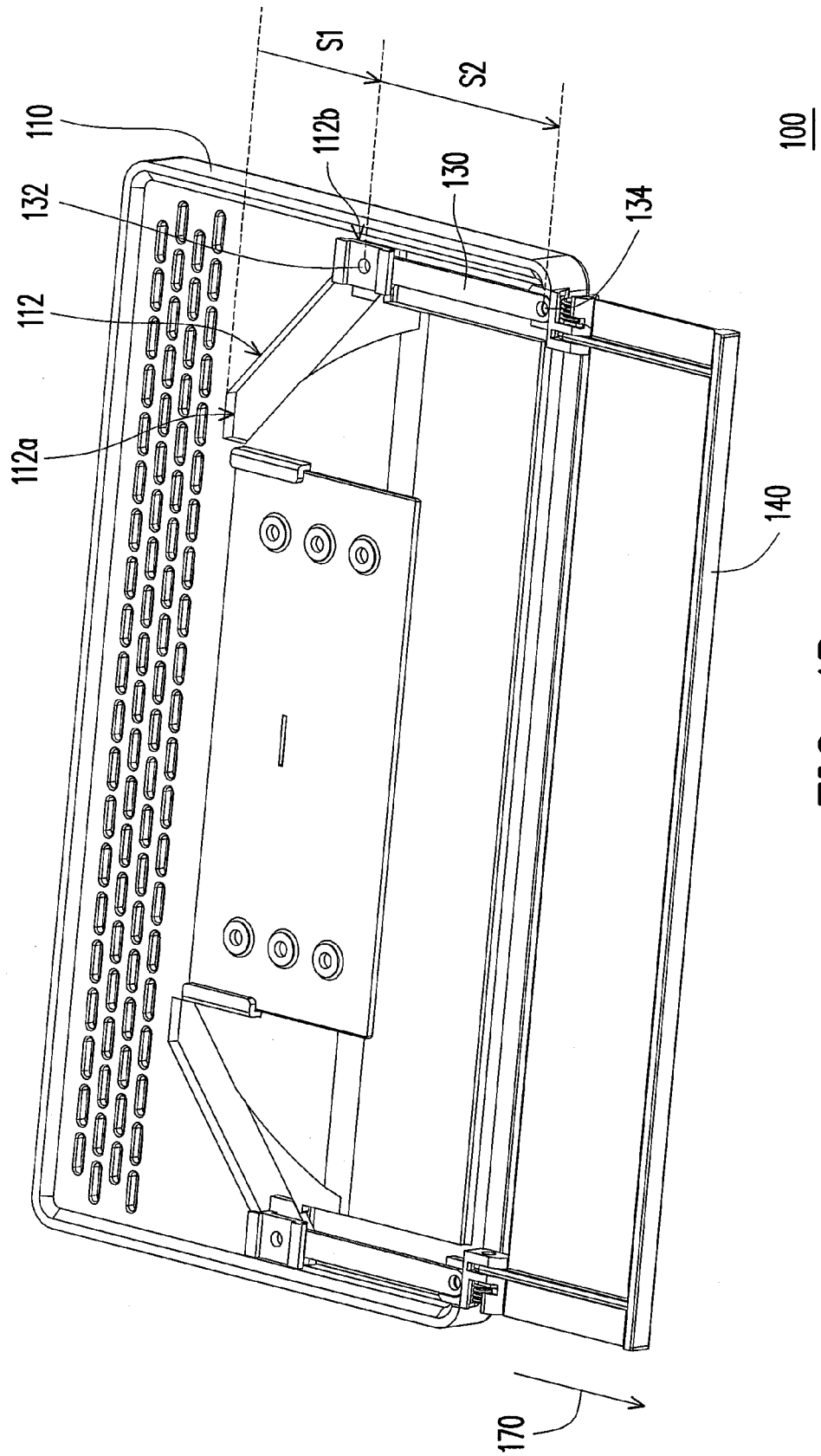
Figure 5B:
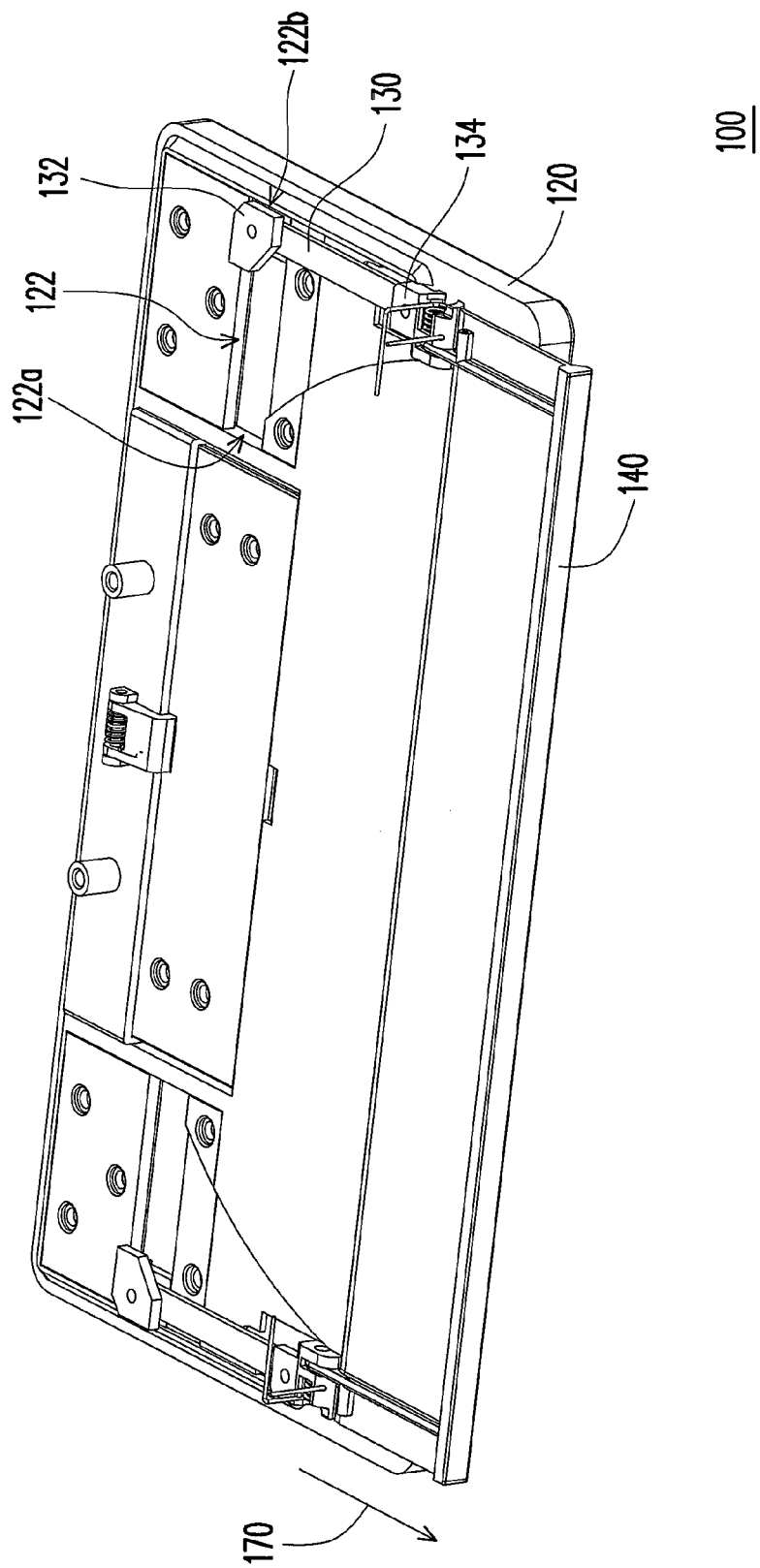

Referring to FIG. 3B, FIG. 4B, and FIG. 5B, the first guide rail 112 and the second guide rail 122 form an angle smaller than 90°, for example, 45°. In the present embodiment, the extension direction of the second guide rail 122 is substantially perpendicular to the operation direction 170. When the user moves the second body 120 relative to the first body 110 along the operation direction 170, the second body 120 drives the driven end 132 to move from a first end 112a of the first guide rail 112 to a second end 112b thereof. Meanwhile, the driven end 132 moves from a third end 122a of the second guide rail 122 to a fourth end 122b thereof. It should be noted that the drive end 134 is driven by the driven end 132 and accordingly drives the stand 140 until the stand 140 is exposed by the first body 110.

Figure 4C:
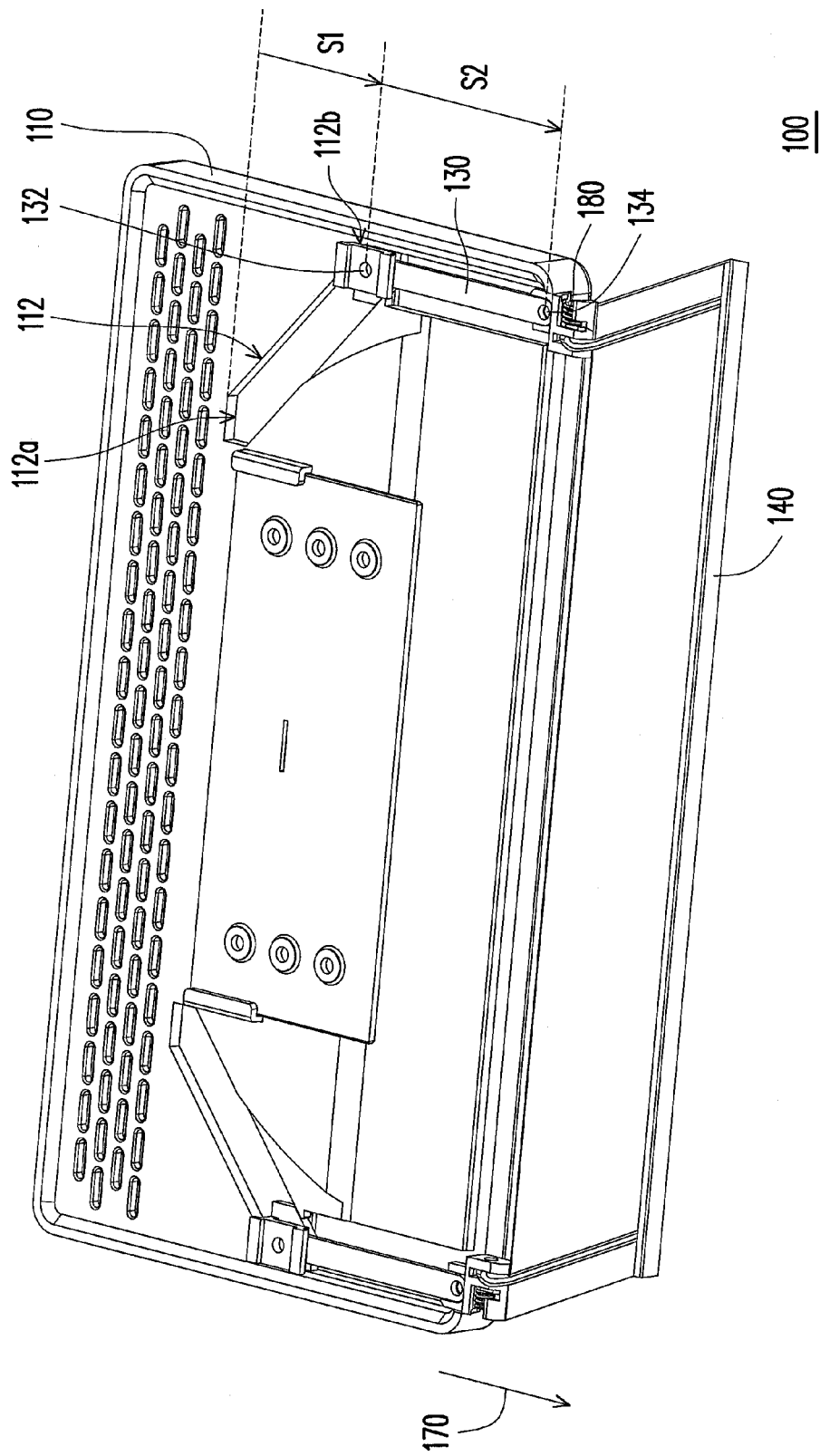
Figure 5C:
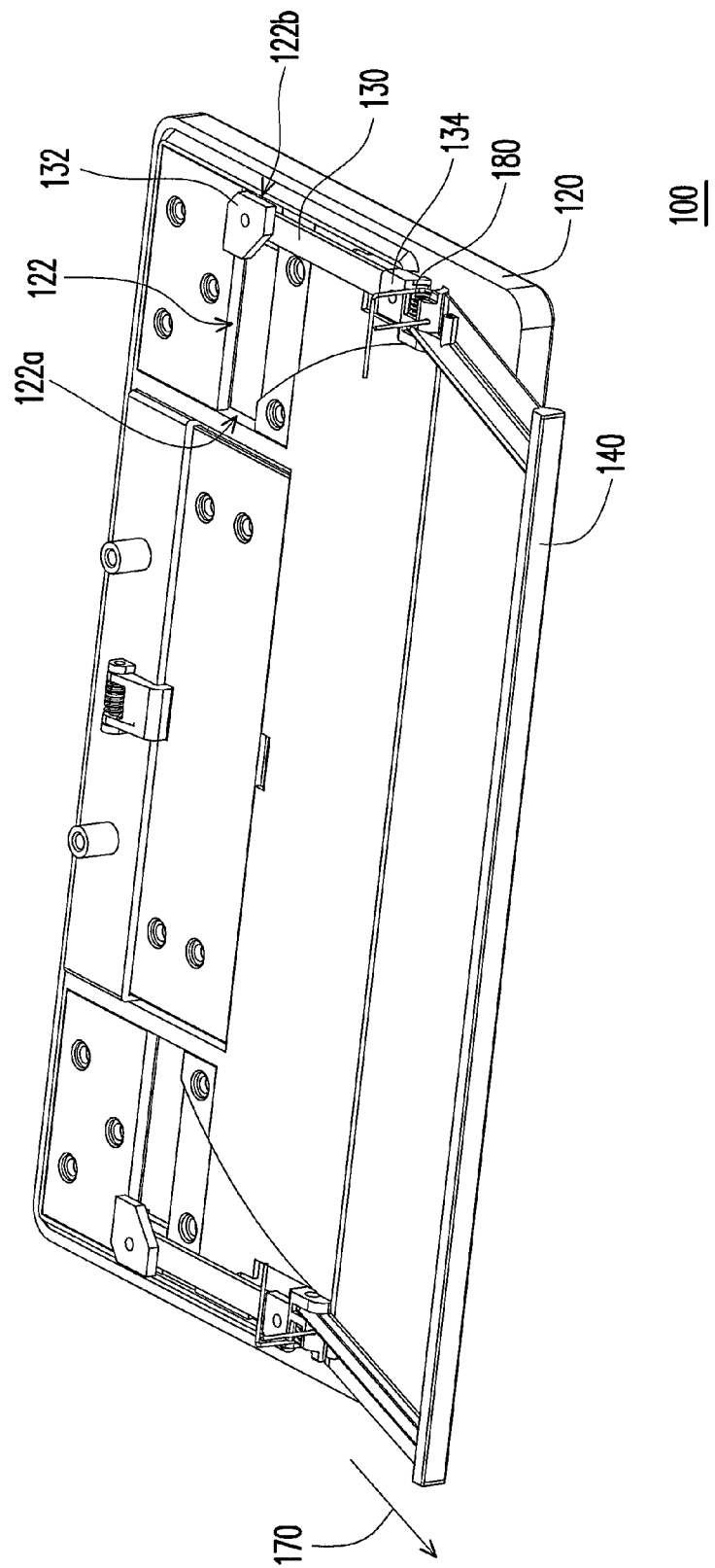

Next, referring to FIG. 3C, FIG. 4C, and FIG. 5C, after the stand 140 is extended out of the first body 110, it pivots relative to the first body 110 and the second body 120. To be specific, the stand 140 pivots away from the second body 120 with the pivot between the stand 140 and the connecting rod 130 as an axis. Accordingly, the handheld electronic device 100 accomplishes the standing function through the stand 140. In the present embodiment, an elastic component 180 (for example, a torsional spring) may be further disposed on the pivot between the stand 140 and the connecting rod 130 to provide a moment to the stand 140, wherein the moment pivots away from the second body 120.

Through the design described above, the user can stand the handheld electronic device 100 on a surface by simply sliding the second body 120 relative to the first body 110 to extend the stand 140 out of the handheld electronic device 100. Thereby, it is made very convenient and simple for the user to operate the handheld electronic device 100. However, the linkage mechanism described above with a connecting rod is only an example of the present application, and those skilled in the art should be able to implement the linkage mechanism by adopting a gear set or a mechanical link component to accomplish the same function as described above.

Additionally, in the linkage mechanism provided in foregoing embodiment, the stand can be completely collected (hidden) when the handheld electronic device 100 is standby, and a sufficient length of the stand can be extended out of the handheld electronic device when the handheld electronic device is in use. Namely, in the operation flow described above, the actual moving stroke of the stand is greater than the relative moving stroke between the first body and the second body, so that a sufficient length of the stand can be extended out of the handheld electronic device and the handheld electronic device can be stably supported.

Referring to FIG. 1A, FIG. 1B, FIG. 4A, and FIG. 4B, when the first body 110 moves relative to the second body 120 along the operation direction 170 for a distance d, the driven end 132 is moved a first stroke S1 equivalent to the distance d along the operation direction 170. Thus, the driven end 132 moves the first stroke S1 from the first end 112a of the first guide rail 112 to the second end 112b thereof.

Next, the drive end 134 is driven by the driven end 132 and correspondingly the drive end 134 and the stand 140 are moved a second stroke S2 along the operation direction 170. In particular, the second stroke S2 is greater than the first stroke S1 so that the stand 140 can be extended out of the handheld electronic device 100. Namely, the actual moving stroke S2 of the stand 140 is greater than the relative moving distance d between the first body 110 and the second body 120, so that a sufficient length of the stand 140 can be extended out of the handheld electronic device 100 and the handheld electronic device 100 can be stably supported.

As described above, when a user wants use a handheld electronic device provided by the present application, the user simply slides the second body relative to the first body along the operation direction. As a result, the stand is driven by the linkage mechanism and exposed by the first body. After that, the stand pivots away from the second body to allow the handheld electronic device to stand on a surface, so that the user can watch a movie through the screen of the handheld electronic device and listen to a music through the speaker thereof without having to hold the handheld electronic device by hand or through any supporting tool. Moreover, in the handheld electronic device provided by the present application, the stand can be completely collected between the first body and the second body so that the handheld electronic device can be carried around conveniently. On the other hand, the actual moving stroke of the stand is greater than the relative moving stroke between the first body and the second body, so that a sufficient length of the stand can be extended out of the handheld electronic device and the handheld electronic device can be stably supported.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
    a first body;
    a second body, slidingly disposed on the first body;
    a linkage mechanism, disposed between the first body and the second body, the linkage mechanism having a driven end and a drive end, wherein the driven end is driven by the first body and the second body; and
    a stand, slidingly disposed between the first body and the second body, and driven by the drive end of the linkage mechanism, wherein when the second body moves away from the first body along an operation direction, the drive end drives the stand to move along the operation direction, and the first body exposes the stand.

2. The handheld electronic device according to claim 1, wherein the second body is moved away from the first body to force the driven end to move a first stroke along the operation direction, the linkage mechanism correspondingly forces the drive end and the stand to move a second stroke along the operation direction, and the second stroke is greater than the first stroke.

3. The handheld electronic device according to claim 2, wherein a first guide rail and a second guide rail are respectively disposed on two adjacent surfaces of the first body and the second body, the first guide rail and the second guide rail cross each other and form an angle smaller than 90°, the linkage mechanism is located between the two surfaces, and the driven end is slidingly disposed in the first guide rail and the second guide rail and located on an intersection between the first guide rail and the second guide rail.

4. The handheld electronic device according to claim 3, wherein the linkage mechanism comprises a connecting rod, one end of the connecting rod is slidingly disposed on the intersection between the first guide rail and the second guide rail as the driven end, and another end of the connecting rod is connected to the stand as the drive end.

5. The handheld electronic device according to claim 4, wherein the stand is pivoted to the connecting rod to pivot away from the second body.

6. The handheld electronic device according to claim 5 further comprising a elastic component disposed on a pivot of the stand and the connecting rod to provide a moment to the stand, wherein the moment pivots away from the second body.

7. The handheld electronic device according to claim 3, wherein the angle formed by the first guide rail and the second guide rail is substantially 45°.

8. The handheld electronic device according to claim 3, wherein an extension direction of the second guide rail is substantially perpendicular to the operation direction.

9. The handheld electronic device according to claim 1 further comprising a screen, wherein the screen is disposed on the second body, and the screen and the first body are respectively located at two opposite sides of the second body.

10. The handheld electronic device according to claim 1 further comprising a speaker, wherein the speaker is disposed at one side of the first body facing the second body, and the second body exposes the speaker when the second body moves relative to the first body along the operation direction.

* * * * *